(12) United States Patent
Bhattacharya et al.

(10) Patent No.: US 9,657,242 B2
(45) Date of Patent: May 23, 2017

(54) QUENCH CHAMBER WITH INTEGRATED SCRUBBER SYSTEM

(71) Applicant: GENERAL ELECTRIC COMPANY, Schenectady, NY (US)

(72) Inventors: Paromita Bhattacharya, Karnataka (IN); Atul Vij, Karnataka (IN); Ajoy Patra, Karnataka (IN); Rajeshwar Sripada, Karnataka (IN)

(73) Assignee: General Electric Company, Schenectady, NY (US)

( * ) Notice: Subject to any disclaimer, the term of this patent is extended or adjusted under 35 U.S.C. 154(b) by 177 days.

(21) Appl. No.: 14/589,012

(22) Filed: Jan. 5, 2015

(65) Prior Publication Data
US 2016/0194570 A1 Jul. 7, 2016

(51) Int. Cl.
*C10J 3/00* (2006.01)
*C10K 1/04* (2006.01)
*C10J 3/84* (2006.01)
*C10K 1/10* (2006.01)
*B01D 53/18* (2006.01)

(52) U.S. Cl.
CPC ............. *C10J 3/845* (2013.01); *B01D 53/185* (2013.01); *C10K 1/04* (2013.01); *C10K 1/101* (2013.01); *B01D 2252/103* (2013.01); *C10J 2200/09* (2013.01); *Y02E 20/16* (2013.01); *Y02E 20/18* (2013.01)

(58) Field of Classification Search
CPC ...................................... C10J 3/82; C10J 3/00
See application file for complete search history.

(56) References Cited

U.S. PATENT DOCUMENTS

| 4,300,913 A * | 11/1981 | Egert | C10J 3/52 261/159 |
|---|---|---|---|
| 4,581,899 A * | 4/1986 | von Klock | C10J 3/485 261/112.1 |
| 4,808,197 A * | 2/1989 | Ayers | C10J 3/485 110/171 |
| 7,846,226 B2 | 12/2010 | Leininger et al. | |
| 8,986,403 B2 * | 3/2015 | Klockow | C10J 3/84 48/61 |
| 2009/0199474 A1 * | 8/2009 | Leininger | C10J 3/52 48/69 |
| 2009/0202403 A1 * | 8/2009 | Jimenez-Huyke | C01B 3/36 422/198 |
| 2011/0120010 A1 | 5/2011 | Tiwari et al. | |
| 2012/0171054 A1 | 7/2012 | Russell et al. | |
| 2013/0047574 A1 | 2/2013 | Kidambi et al. | |
| 2013/0175476 A1 | 7/2013 | Kumar et al. | |
| 2014/0014186 A1 | 1/2014 | Bhattacharya et al. | |
| 2014/0061539 A1 | 3/2014 | Balasubramaniyan et al. | |
| 2014/0090296 A1 * | 4/2014 | Talcott | C10K 1/04 48/61 |

* cited by examiner

*Primary Examiner* — Matthew Merkling
(74) *Attorney, Agent, or Firm* — Eversheds Sutherland (US) LLP

(57) ABSTRACT

The present application provides a gasifier for creating a flow of a syngas. The gasifier may include a reaction chamber and a quench chamber. The quench chamber may include a number of integrated scrubber trays therein such that the syngas first enters a quench pool via a dip tube and then passes through the scrubber trays before leaving the quench chamber.

16 Claims, 3 Drawing Sheets

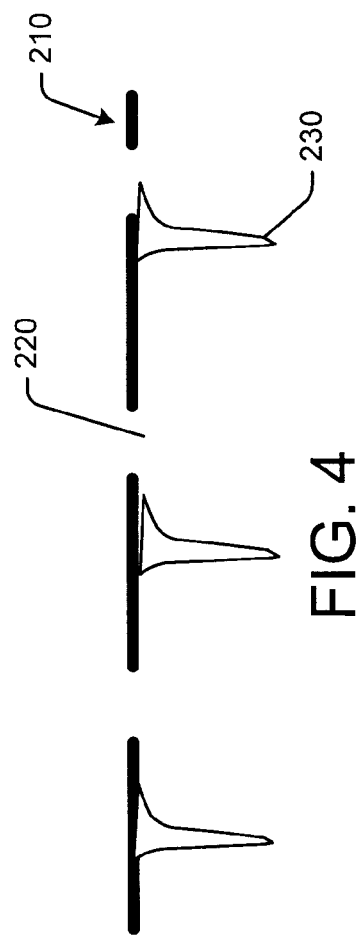
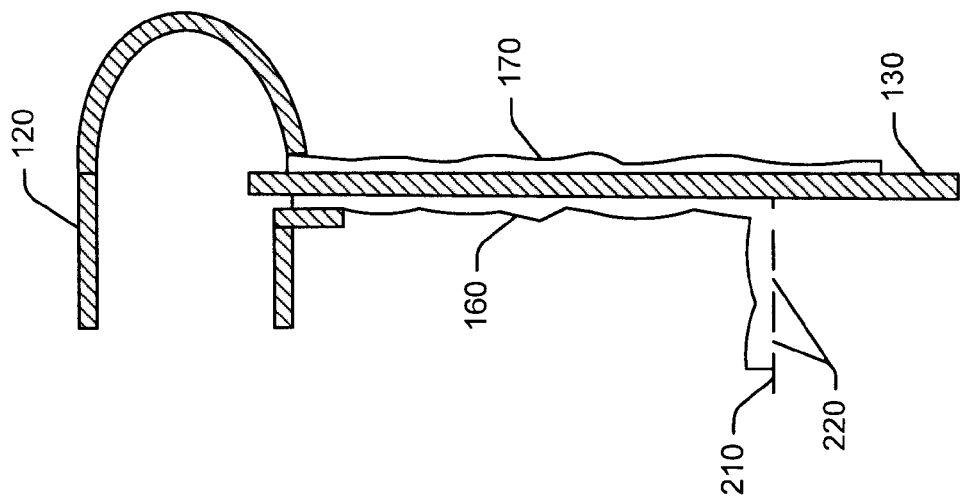
FIG. 4
FIG. 3

QUENCH CHAMBER WITH INTEGRATED SCRUBBER SYSTEM

TECHNICAL FIELD

The present application and the resultant patent relate generally to gasification systems and more particularly relate to a gasifier having a quench chamber with a dip tube and an integrated scrubber system for increased stability and a reduction in overall gasification systems costs.

BACKGROUND OF THE INVENTION

Fossil fuels may be gasified for the use in the production of electricity, chemicals, synthetic fuels, and for a variety of other applications. Gasification involves reacting a carbonaceous fuel and oxygen at very high temperatures to produce a syngas. Generally described, a syngas is a fuel containing carbon monoxide and hydrogen. Syngas burns more efficiently and cleanly than the carbonaceous fuel in its original state. An integrated gasification combined cycle power plant or a chemical plant may include one or more gasifiers to produce the syngas. The resulting syngas, however, may also include undesirable components such as slag and ash. The hot, dirty syngas may be directed through a quench unit so as to cool the syngas to a saturation temperature and to remove some of the undesirable components. The life span of the quench unit, however, may be affected by the exposure to the syngas and the other components therein. This exposure also may reduce the efficiency and/or the operating range of the gasifier.

There is thus a desire for a gasifier and related systems with an improved quench chamber and related components. Preferably such an improved quench chamber and methods of use thereof may provide increased operational stability in light of exposure to the syngas and with a reduced overall footprint and with reduced overall costs.

SUMMARY OF THE INVENTION

The present application and the resultant patent thus provide a gasifier for creating a flow of a syngas. The gasifier may include a reaction chamber and a quench chamber. The quench chamber may include a number of integrated scrubber trays therein. The gasifier described herein thus may avoid the need for a separate gas scrubber unit.

The present application and the resultant patent further provide a method of cooling and scrubbing a flow of hot, dirty syngas in a quench chamber. The method may include the steps of flowing hot syngas down a dip tube, cooling the hot syngas in a quench pool, flowing the cooled syngas through a number of scrubber trays, and counterflowing water along the number of the scrubber trays so as to scrub the rising syngas.

The present application and the resultant patent further provide a quench chamber for cooling and scrubbing a flow of a syngas. The quench chamber may include a quench ring, a dip tube extending from the quench ring, a quench pool, and a number of scrubber trays positioned about the dip tube.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 3 is a schematic diagram of a quench ring for use with the quench chamber of FIG. 2.

FIG. 4 is a schematic diagram of a scrubber tray for use with the scrubber system of the quench chamber of FIG. 2.

DETAILED DESCRIPTION

Figure 1:
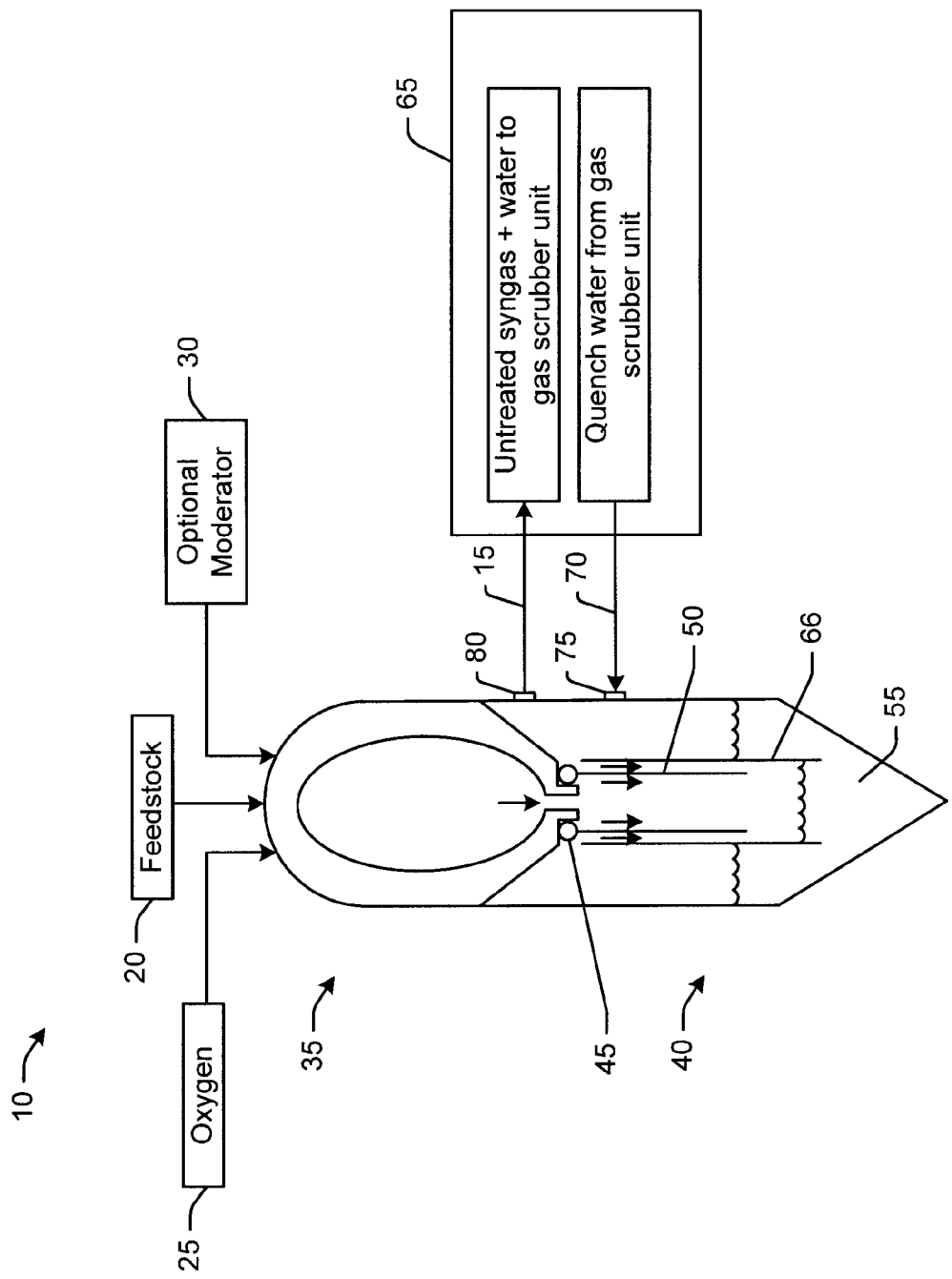
FIG. 1 is a schematic diagram of a gasifier system.

Referring now to the drawings, in which like numerals refer to like elements throughout the several views, FIG. 1 is a schematic diagram of an example of a gasifier 10. A described above, the gasifier 10 may create a flow of a syngas 15 by reacting a carbonaceous feedstock 20 with a flow of oxygen 25 and possibly an optional moderator 30 such as a flow of steam and the like. Different types of syngas 15 may be produced herein.

Generally described, the gasifier 10 may include a reaction chamber 35 for the high pressure and the high temperature reactions necessary to create the syngas 15. The reaction chamber 35 may be of conventional design. The gasifier 10 also may include a quench chamber 40 in communication with the reaction chamber 35 to receive the flow of hot, dirty syngas 15. The quench chamber 40 may include a quench ring 45 positioned about the reaction chamber 35. A dip tube 50 may extend from the quench ring 45 downward towards a quench chamber pool 55. A draft tube 60 may surround the dip tube 50 and may create an annular chamber therebetween. The quench chamber 40 and the components thereof may be of conventional design.

The gasifier 10 and the quench chamber 40 may be in communication with an external gas scrubber unit 65. Specifically, the quench chamber 40 may receive a flow of quench water 70 from the gas scrubber unit 65 via a quench water inlet 75. The flow of quench water 70 may flow through the quench ring 45 and down the dip tube 50 into the quench chamber pool 55. The flow of quench water 70 cools the dip tube 50 as well as the flow of syngas 15 descending through the dip tube 50. The draft tube 60 may insure some amount of particle wetting and removal therein.

Once cooled, the flow of syngas 15 may rise through the quench chamber 40 and exit via a syngas outlet 80. The flow of syngas 15 then may be cleaned and/or otherwise treated in the gas scrubber unit 65. The gas scrubber 65 may remove additional fine particles and other contaminants from the flow of syngas 15. The gas scrubber unit 65 also may remove entrained water which then may be used as the quench water flow 70 described above. The quench chamber pool 55 of the quench chamber 40 also provides slag removal. The gasifier 10 described herein is for the purpose of example only. Many other gasifier designs and components may be used.

Figure 2:
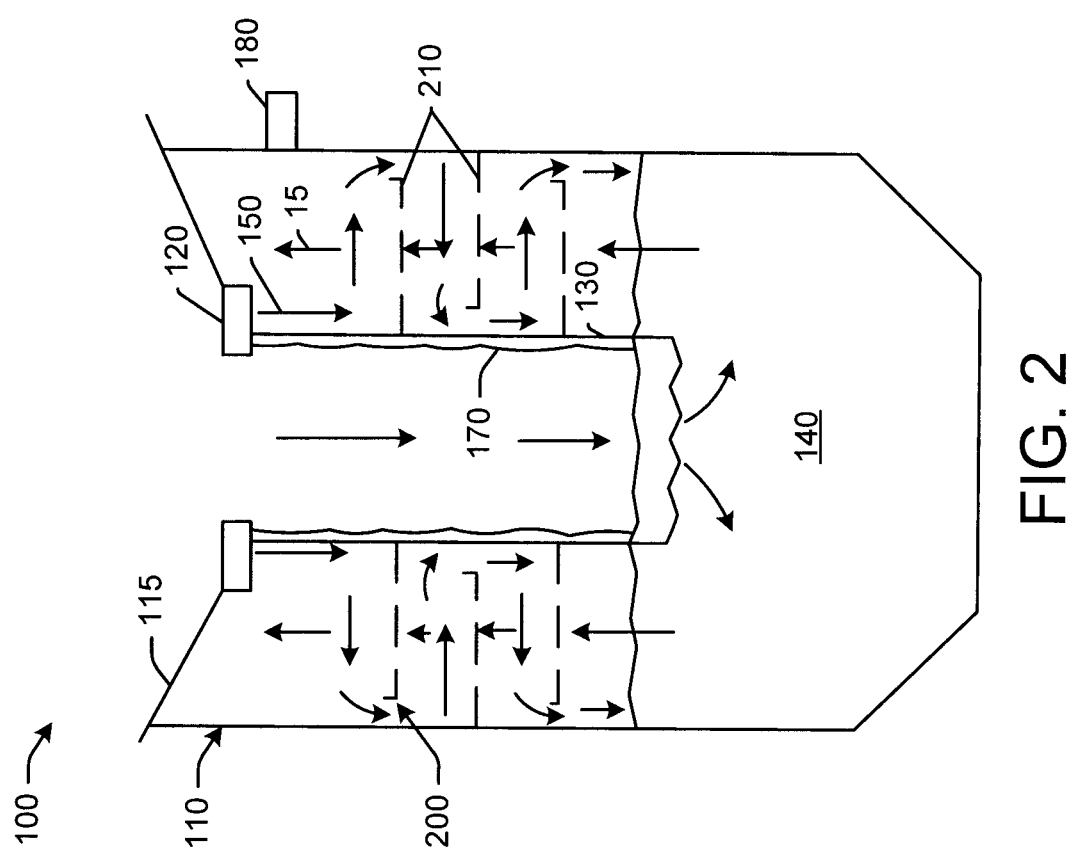
FIG. 2 is a schematic diagram of a portion of a gasifier showing a quench chamber with an integrated scrubber system as may be described herein.

FIGS. 2-4 show a portion of a gasifier 100 as may be described herein. Specifically, FIG. 2 shows an example of a quench chamber 110 for use with the gasifier 100. The quench chamber 110 may cool a flow of the hot, dirty syngas 15 from a reaction chamber 115 and the like.

The quench chamber 110 may include a quench ring 120 positioned therein in communication with the reaction chamber 35. A dip tube 130 may extend downwardly from the quench ring 120. The dip tube 130 may extend towards a quench pool 140. The quench ring 120, the dip tube 130, and the quench pool 140 may be largely of conventional design and may have any suitable size, shape, or configuration. The quench chamber 110 may lack a draft tube and/or similar structures. Other components and other configurations also may be used herein.

As is shown in FIG. 3, the quench ring 120 and the dip tube 130 may be in communication with a continuous flow of water 150. The continuous flow of water 150 may flow through the quench ring 120 and may create an outer film 160 and an inner film 170 along the length of the dip tube 130. The outer film 160 and the inner film 170 may provide cooling thereto. The flow of syngas 15 thus may extend down the dip tube 130 so as to be cooled within the quench pool 140. The syngas 15 also may be cooled further from the outer film 160 of the continuous flow of water 150 as the syngas 15 rises and then exits via a syngas outlet 180. Slag and other undesirable components may be removed via the quench pool 140. Other components and other configurations may be used herein.

The quench chamber 110 also may include an integrated scrubber system 200. The scrubber system 200 may be positioned within the quench chamber 110 between the quench ring 120 and the quench pool 140 or otherwise. The scrubber system 200 may include a number of scrubber trays 210 mounted about the dip tube 130 or elsewhere. The scrubber trays 210 may include a number of perforations 220 therethrough. The perforations 220 may be sized for fine particle wetting and for syngas scrubbing. Varying sizes and shapes may be used herein. Any number of the scrubber trays 210 and any number of the perforations 220 may be used herein in any suitable size, shape, or configuration.

As is shown in FIG. 4, the scrubber trays 210 may have a number of protrusions 230 positioned on the bottom thereof adjacent to the perforations 220. The perforations 230 may be relatively sharp and pin like. Any number of the protrusions 230 may be used in any suitable size, shape, or configuration. The protrusions 230 may prevent the buildup of froth thereon. The outer film 160 of the flow of water 150 thus may descend along the outside of the dip tube 130 and then across each of the scrubber trays 210 before flowing into the quench pool 140. Other components and other configurations may be used herein.

In use, the continuous flow of water 150 not only cools the dip tube 130 with the hot syngas therein, but the outer film 160 is also provided to the scrubber trays 210 so as to create a counter flow between the water 150 and the syngas 15 as well as to provide an additional source of cooling to the dip tube 130. Specifically, the syngas 15 may be bubbled through the water 150 on each of the scrubber trays 210. The flow of water 150 thus increases contact time so as to increase fine particle wetting and removal. The risk of froth formation is limited via the use of the protrusions 230 to break any bubbles rising therein. The cooled, cleaned flow of syngas 15 then may be routed for further processing and/or use.

The use of the integrated scrubber system 200 within the quench chamber 110 thus may eliminate the need for a downstream gas scrubber unit and/or at least reduce the size thereof. Moreover, removal of the draft tube may avoid solids plugging therein and the associated increase in operational instability. In designs used for higher syngas pressures, the velocity of the syngas in conventional dip and draft tube designs may be relatively low. Such low velocity may lead to the formation of slugs and resulting instability. The elimination of the draft tube thus also eliminates the cause of slug formation for more stable operation. The flow of syngas 15 may rise faster in the absence of the draft tube such that the dip tube 130 may be lower and the scrubber trays 210 may be accommodated therein. Similarly, the present configuration may avoid solids plugging in the quench ring 120 so as to provide a cleaner condensate flow.

Significantly, overall gasifier system costs should be reduced by quenching and scrubbing in the same pressure vessel. Current systems using a quench chamber for cooling and slag removal require a downstream scrubber unit to remove additional fine particles and the like. Such systems thus have duplicate high pressure vessels with the associated costs. The overall footprint of the gasification system thus also may be reduced with the elimination and/or reduction of the separate gas scrubber unit herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gasifier for creating a flow of a syngas, comprising:
a reaction chamber; and
a quench chamber;
the quench chamber comprising a plurality of integrated scrubber trays therein,
wherein the plurality of scrubber trays comprises a plurality of perforations therein,
wherein the plurality of scrubber trays comprises a plurality of protrusions extending downward from a bottom of the plurality of scrubber trays and positioned about the plurality of perforations.

2. The gasifier of claim 1, wherein the quench chamber comprises a quench ring therein.

3. The gasifier of claim 2, wherein the quench chamber comprises a dip tube extending from the quench ring.

4. The gasifier of claim 3, wherein the quench chamber comprises a flow of water extending from the quench ring and down the dip tube.

5. The gasifier of claim 4, wherein the flow of water comprises an outer film and an inner film along the dip tube.

6. The gasifier of claim 4, wherein the flow of water is in a counter flow arrangement with a flow of cooled syngas.

7. The gasifier of claim 3, wherein the quench chamber comprises a quench pool downstream of the dip tube.

8. The gasifier of claim 3, wherein the plurality of scrubber trays are positioned about the dip tube.

9. The gasifier of claim 3, wherein the dip tube comprises a downward path for a flow of hot syngas.

10. The gasifier of claim 1, wherein the quench chamber comprises a syngas outlet.

11. The gasifier of claim 1, wherein the plurality of protrusions comprises a sharp, pin-like shape.

12. The gasifier of claim 1, wherein the plurality of scrubber trays comprises an upward path for a flow of cooled syngas.

13. A method of cooling and scrubbing a flow of syngas in a quench chamber, comprising:

flowing hot syngas down a dip tube;

cooling the hot syngas in a quench pool;

flowing the cooled syngas through a plurality of scrubber trays; and counter-flowing water along the plurality of scrubber trays to scrub the cooled syngas, wherein the plurality of scrubber trays comprises a plurality of perforations therein, wherein the plurality of scrubber trays comprises a plurality of protrusions extending downward from a bottom of the plurality of scrubber trays and positioned about the plurality of perforations.

14. A quench chamber for cooling and scrubbing a flow of a syngas, comprising:

a quench ring;

a dip tube extending from the quench ring;

a quench pool; and a plurality of scrubber trays positioned about the dip tube, wherein the plurality of scrubber trays comprises a plurality of perforations therein, wherein the plurality of scrubber trays comprises a plurality of protrusions extending downward from a bottom of the plurality of scrubber trays and positioned about the plurality of perforations.

15. The quench chamber of claim 14, further comprising a flow of water extending from the quench ring and down the dip tube and the plurality of scrubber trays.

16. The quench chamber of claim 15, wherein the flow of water comprises an outer film and an inner film along the dip tube.

\* \* \* \* \*